United States Patent Office 3,828,019
Patented Aug. 6, 1974

3,828,019
WATER-INSOLUBLE BENZIMIDAZOLONE-(5)-SULFONAMIDOPHENYLENE - AZO - ARYL DYESTUFFS
Peter Junker, Niederhochstadt, Taunus, Joachim Ribka, Offenbach am Main, and Walter Kunstmann, Neuenhain, Taunus, Germany, assignors to Farbwerke Hoechst Aktiengesellschaft vormals Meister Lucius & Bruning, Frankfurt am Main, Germany
No Drawing. Filed Sept. 6, 1972, Ser. No. 286,770
Claims priority, application Germany, Sept. 8, 1971,
P 21 44 907.0
Int. Cl. C09b 33/16, 29/36
U.S. Cl. 260—157                                  4 Claims

ABSTRACT OF THE DISCLOSURE

The present invention relates to novel water-insoluble mono- and disazo dyestuffs of the general formula

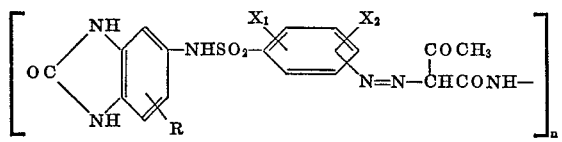

wherein $X_1$ and $X_2$ may be identical or different and represent a hydrogen atom, a lower alkyl or alkoxy group having preferably 1 to 4 carbon atoms, or a halogen atom, preferably a chlorine or bromine atom, and R is a hydrogen or halogen atom, preferably a chlorine or bromine atom, a methyl, ethyl, methoxy or ethoxy group, $n$ represents the numbers 1 or 2 and A an optionally substituted radical, preferably of the benzene, naphthalene or benzimidazolone series of $n=1$, and of the benzene or diphenyl series if $n=2$.

These dyestuffs may be used for dyeing or printing lacquers, polymers or textile materials. They show a good fastness to light, to weather and to migration. Furthermore, they are fast to heat, have a high tinctorial strength and show in many cases pure shades. They are resistant to the influence of chemical products, especially solvents, acids and alkalis.

---

The present invention relates to novel water-insoluble mono- and disazo dyestuffs of the general formula

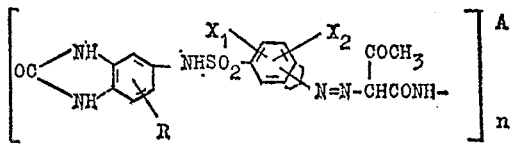

wherein $X_1$ and $X_2$ may be identical or different and represent a hydrogen atom, a lower alkyl or alkoxy group having preferably 1 to 4 carbon atoms, or a halogen atom, preferably a chlorine or bromine atom, and R is a hydrogen or halogen atom, preferably a chlorine or bromine atom, a methyl, ethyl, methoxy or ethoxy group, $n$ represents the numbers 1 or 2 and A an optionally substituted radical, preferably of the benzene, naphthalene or benzimidazolone series if $n=1$, and of the benzene or diphenyl series if $n=2$.

The invention further relates to a process for preparing the above-mentioned dyestuffs, which comprises coupling diazotized aromatic amines of the general formula

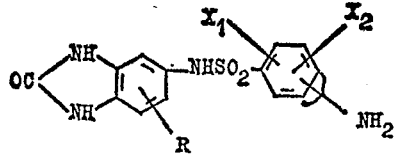

with coupling components of the general formula

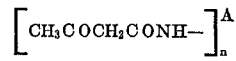

wherein $X_1$, $X_2$, R, $n$ and A have the above meanings.

The diazo components used are novel. They may be prepared according to known methods, for example by condensation of sulfochlorides of the general formulae

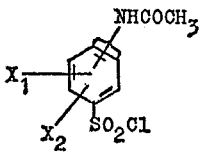 or 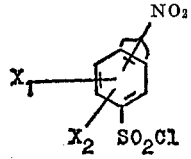

with 5-amino-benzimidazolones of the general formula

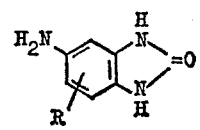

and subsequent hydrolysis of the acetyl group or reduction of the nitro group to the amino group.

As sulfo chlorides in the above reaction there are used for example:

4-acetamino-benzenesulfochloride,
2-chloro-4-acetaminobenzene-sulfochloride,
3-chloro-4-acetaminobenzene sulfochloride,
3-bromo-4-acetaminobenzene sulfochloride,
2,5-dichloro-4-acetaminobenzene sulfochloride,
3-methyl-4-acetaminobenzene sulfochloride,
3-n-butyl-4-acetaminobenzene sulfochloride,
2,5-dimethyl-4-acetaminobenzene sulfochloride,
2,5-di-n-propyl-4-acetaminobenzene sulfochloride,
2-chloro-5-ethyl-4-acetaminobenzene sulfochloride,
2,5-dimethoxy-4-acetaminobenzine sulfochloride
2,5-diethoxy-4-acetaminobenzene sulfochloride,
2-ethoxy-5-methoxy-4-acetaminobenzene sulfochloride,
2-methyl-5-ethyl-4-acetaminobenzene sulfochloride,
2-methyl-5-ethoxy-4-acetaminobenzene sulfochloride,
2-chloro-5-methyl-4-acetaminobenzene sulfochloride,
2-methoxy-5-bromo-4-acetaminobenzene sulfochloride,
2-propoxy-5-chloro-4-acetaminobenzene sulfochloride,
2-chloro-5-ethoxy-4-acetaminobenzene sulfochloride,
3-acetaminobenzene sulfochloride,
4-chloro-3-acetaminobenzene sulfochloride,
4-methoxy-3-acetaminobenzene sulfochloride,
4-ethyl-3-acetaminobenzene sulfochloride,
6-chloro-4-ethyl-3-acetaminobenzene sulfochloride,
4,6-dimethyl-3-acetaminobenzene sulfochloride,
4-butoxy-3-acetaminobenzene sulfochloride,
4-methoxy-6-bromo-3-acetaminobenzene sulfochloride
or 4-methyl-6-n-butyl-3-acetaminobenzene sulfochloride.

There are also considered starting compounds which differ from the above-mentioned ones by the fact that they carry a nitro group instead of the acetamino group. Especially preferred are 4-acetylamino or 4-nitrobenzenesulfochlorides which carry hydrogen or chlorine atoms or methoxy groups in a 2- and 5-position.

As 5-amino-benzimidazolones there may be used for example:

5-amino-benzimidazolone
6-chloro-5-amino-benzimidazolone
7-chloro-5-amino-benzimidazolone
6-bromo-5-amino-benzimidazolone
7-bromo-5-amino-benzimidazolone
6-methyl-5-amino-benzimidazolone
7-methyl-5-amino-benzimidazolone
7-ethyl-5-amino-benzimidazolone 7-methoxy-5-amino-benzimidazolone
7-ethoxy-5-amino-benzimidazolone Most of the compounds used as coupling components of the general formula

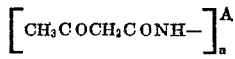

are described in the literature and may be prepared according to known methods, for example by reacting an aromatic mono or diamine with diketene or acetoacetic acid methyl ester. Suitable coupling components are:

N-acetoacetylaniline
1-acetoacetylamino-naphthalene
N-acetoacetyl-2-chloro-aniline
N-acetoacetyl-4-chloro-aniline
N-acetoacetyl-2,4-dichloro-aniline
2-acetoacetylamino-anisole
4-acetoacetylamino-anisole
4-acetoacetylamino-phenetole
N-acetoacetyl-2,5-dimethoxy-aniline
N-acetoacetyl-2,4-dimethoxy-aniline
N-acetoacetyl-4-chloro-2,5-dimethoxy-aniline
N-acetoacetyl-5-chloro-2,4-dimethoxy-aniline
2-acetoacetylamino-toluene
4-acetoacetylamino-toluene
4-acetoacetylamino-1,3-xylene
4-acetoacetylamino-acetylaminobenzene
2-acetoacetylamino-5-chloro-toluene
2-acetoacetylamino-5-acetylamino-4-chloro-toluene
5-acetoacetylamino-benzimidazolone
5-acetoacetylamino-6-chloro-benzimidazolone
5-acetoacetylamino-7-chloro-benzimidazolone
1,4-bis-acetoacetylamino-benzene
1,4-bis-acetoacetylamino-2-chloro-benzene
1,4-bis-acetoacetylamino-2,5-dichloro-benzene
2,5-bis-acetoacetylamino-toluene
2,5-bis-acetoacetylamino-1,4-xylene
2,5-bis-acetoacetylamino-anisole
1,4-bis-acetoacetylamino-2,5-dimethoxy-benzene
2,5-bis-acetoacetylamino-4-methoxy-toluene
N,N'-bis-acetoacetyl-benzidine
N,N'-bis-acetoacetyl-3,3'-dichloro-benzidine
N,N'-bis-acetoacetyl-2,2'-dichloro-benzidine
N,N'-bis-acetoacetyl-3,3'-dimethoxy-benzidine
N,N'-bis-acetoacetyl-3,3'-dimethyl-benzidine The mono- and diazo dyestuffs of the invention are prepared according to known processes, for example by coupling the diazotized aromatic amines with the coupling components in an aqueous medium, preferably in the presence of a non-ionic anion-active or cation-active dispersing agent or in the presence of an organic solvent. The coupling reaction may also be carried out in organic solvents. In some cases the diazonium salts are difficultly soluble in an aqueous medium and they precipitate. They may be isolated and coupled as a moist paste. Diazotation may also be performed in a suitable organic medium, for example in glacial acetic acid, alcohol, dioxane, tetrahydrofurane, formamide, dimethyl formamide or dimethyl sulfoxide and the solution thus obtained of the diazonium compound may be combined with the coupling component.

It is often suitable to subject the dyestuffs thus obtained to an after-treatment, in order to achieve the full color intensity and a particularly suitable crystal structure. For this purpose the moist or dried and ground dyestuffs are heated for some time under reflux or up to higher temperatures under pressure in pyridine, dimethyl formamide or other organic solvents such as dimethyl sulfoxide, alcohol, chlorobenzene, dichlorobenzene, glacial acetic acid, quinoline, glycol or nitrobenzene. In some cases the conversion into a particularly suitable crystal structure is obtained by heating with water to boil or up to higher temperatures under pressure, if desired, under addition of dispersing agents and, if desired, under addi-tion of organic solvents, for example of the above-mentioned type.

The new dyestuffs are water-insoluble pigments. They are suitable for preparing colored lacquers, lacquer formers, solutions and products of acetyl cellulose, natural or synthetic resins, such as polymerization or condensation resins, as for example amino- or pheno-plast resins, as well as of polystyrene, polyolefines, such as polyethylene or polypropylene, polyacrylic compounds, polyvinyl compounds such as polyvinyl chloride or polyvinyl acetate, polyesters, rubber, casein or silicone resins.

The new pigment dyestuffs are also suitable for pigment printing on substrates, especially textile fibre materials or other articles having a plane surface, such as paper.

The dyestuffs may also be used for other purposes, for example in a finely divided form for dyeing viscose rayon or cellulose ethers, or esters, polyamides, polyurethanes, polyglycol terephthalates or polyacrylonitrile in the spinning mass, or for dyeing paper.

The dyestuffs show in the mentioned media a good fastness to light, to weather and to migration. Furthermore, they are fast to heat, have a high tinctorial strength and show in many cases pure shades. They are resistant to the influence of chemical products, especially solvents, acids and alkalis.

Among the dyestuffs according to the invention, the following ones are characterized by their excellent fastness properties and the brilliant shades frequently very pure:

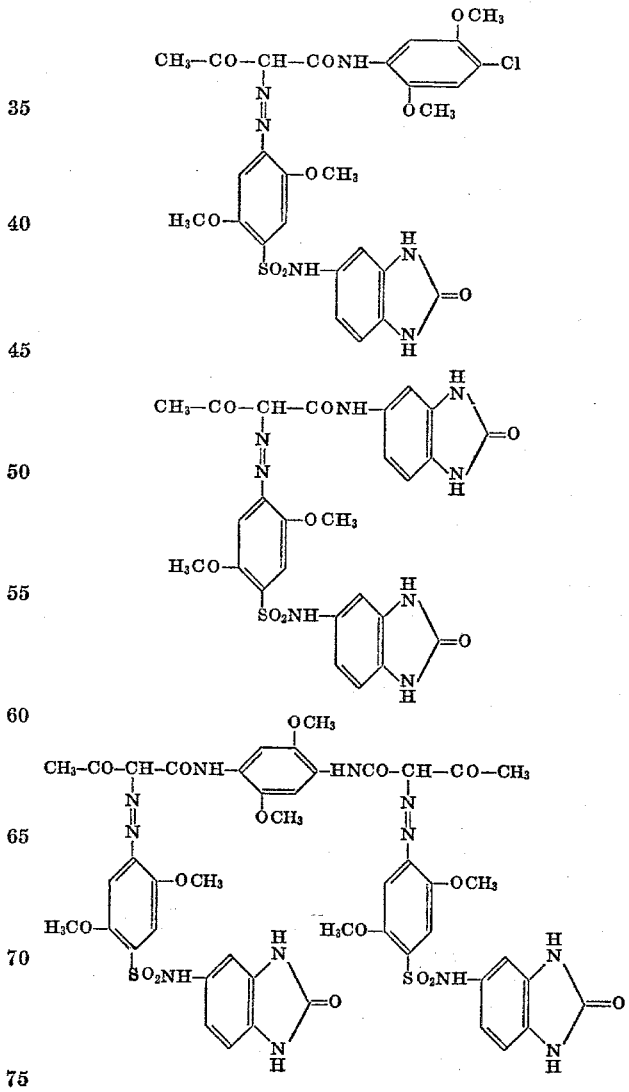

The following Examples illustrate the invention. Parts and percentages are by weight unless stated otherwise. The relationship between "parts by weight" and "parts by volume" is as "grams to cubic centimeter."

EXAMPLE 1

36.45 parts of 5-(2,5'-dimethoxy-4'-amino-benzene-sulfonylamino)-benzimidazolone were stirred for one hour with 200 parts by volume of glacial acetic acid and 30 parts by volume of a 37% hydrochloric acid and diazotized at 10–15° C. with 22 parts by volume of a 5N sodium nitrite solution. Stirring was continued for 30 minutes, the mixture was diluted with 200 parts by volume of ice water, the excess of nitrite was destroyed with amidosulfonic acid and the mixture was clarified.

30 parts of N-acetoacetyl-4-chloro-2,5-dimethoxy-aniline were dissolved in 100 parts by volume of water and 10 parts by volume of a 33% sodium hydroxide solution and the solution was clarified. 300 parts by volume of water, 12 parts by volume of glacial acetic acid and 10 parts by volume of a 10% aqueous solution of the reaction product of 1 mol of stearylic alcohol with 20 mols of ethylene oxide were introduced into the coupling vessel. The temperature was adjusted to 5° C. by addition of ice and the clarified solution of the coupling component was added dropwise. Then the temperature was increased to 20° C. and the diazonium salt solution was slowly introduced. By introducing simultaneously 700 parts by volume of 2N sodium hydroxide solution, the pH value was maintained at 5.5–6.5.

When the coupling was terminated, the mixture was heated to 95° C. by introducing steam, this temperature was maintained for 15 minutes, the dyestuff was suction-filtered, washed with water and dried at 65° C. The dried dyestuff was ground, refluxed with 600 parts by volume of glacial acetic acid for 30 minutes, suction-filtered hot, washed with water, dried and ground.

When being incorporated into polyvinyl chloride, into a lacquer, a printing ink or a spinning mass, the pigment dyestuff thus obtained of the formula

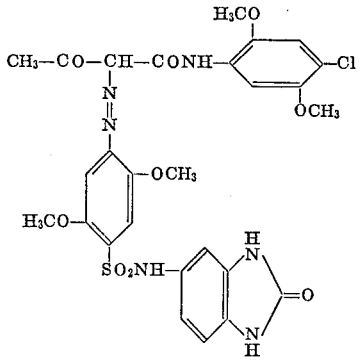

provided pure reddish yellow colorations having a very good fastness to heat, to migration and to light.

EXAMPLE 2

36.45 parts of 5 - (2',5'-dimethoxy-4'-amino-benzene-sulfonylamino)-benzimidazolone were diazotized as in Example 1.

24.6 parts of 5-acetoacetylamino-benzimidazolone were dissolved in 150 parts by volume of a 2N sodium hydroxide solution, mixed with a solution of 66 parts of sodium acetate in 400 parts by volume of water and clarified into the coupling vessel. After the addition of 10 parts by volume of a 10% aqueous solution of the reaction product of 1 mol of stearylic alcohol and 20 mols of ethylene oxide, the coupling component was reprecipitated by introducing rapidly 146 parts by volume of a 2N acetic acid. The diazonium salt solution was slowly added dropwise to the suspension thus obtained, while the pH value was maintained at 5–6.5 by introducing simultaneously a 2N sodium hydroxide solution. When the coupling was terminated, the reaction mixture was heated for one hour to 95° C., the dyestuff was suction-filtered hot and washed with hot water.

The moist press cake was put into a pressure vessel and the contents of water was determined with a sample. An amount of water was added so that the press cake contained 300 parts of water, 300 parts by volume of ethanol were added, and the mixture was heated for 9.5 hours under pressure up to 150° C. After cooling the dyestuff was suction-filtered, washed with water, dried and ground.

When being incorporated into polyvinyl chloride, into a lacquer, a printing ink or a spinning mass, the pigment dyestuff thus obtained of the formula

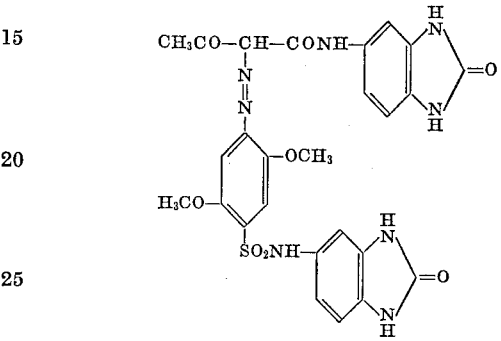

provided pure reddish yellow colorations having a very good fastness to heat and a very good fastness to light and to migration.

If in the above Example the 5-(2',5'-dimethoxy-4'-amino-benzene-sulfonylamino)-benzimidazolone was replaced by the equivalent amount of 5 - (2',5'-diethoxy-4'-aminobenzene-sulfonylamino)-benzimidazolone, a yellow pigment was also obtained which—after being incorporated into polyvinyl chloride, a lacquer, a printing ink or a spinning mass—also provided reddish yellow colorations having similar good fastness properties.

EXAMPLE 3

36.45 parts of 5-(2',5'-dimethoxy-4'-amino-benzenesulfonylamino)-benzimidazolone were diazotized as in Example 1.

16.8 parts of N,N'-bis-acetoacetyl-2,5-dimethoxy-1,4-diaminobenzene were dissolved, while heating, in 350 parts by volume of pyridine, mixed with 10 parts by volume of a 10% aqueous solution of the reaction product of 1 mol of stearylic alcohol with 20 mols of ethylene oxide and cooled to 20° C. Then the diazonium salt solution was introduced slowly and stirring was continued for 2 hours. The dyestuff was suction-filtered, washed with water, dried, ground and heated in a pressure vessel with 450 parts by volume of ethanol for 5 hours to 150° C. After cooling it was suction-filtered again, dried and ground. When being incorporated into polyvinyl chloride, into a lacquer, a printing ink or a spinning mass, the pigment dyestuff thus obtained of the formula

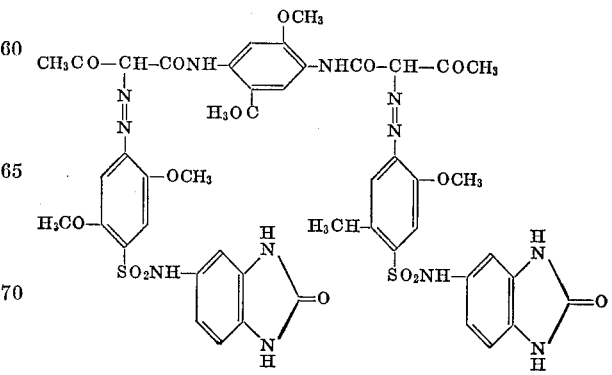

provided orange dyeings having a very good fastness to heat and a very good fastness to light and to migration.

EXAMPLE 4

36.45 Parts of 5-(2',5'-dimethoxy-4'-amino-benzenesulfonylamino)-benzimidazolone were diazotized as in Example 1. 19 Parts of N,N'-bis-acetoacetyl-3,3'-dimethyl-benzidine were dissolved hot in 400 parts by volume of pyridine, mixed with 10 parts by volume of a 10% aqueous solution of the reaction product of 1 mol of stearylic alcohol with 20 mols of ethylene oxide and cooled to 20° C. Then the diazonium salt solution was slowly added dropwise. Stirring was continued for two hours, the whole was suction-filtered, washed with water, dried, ground and refluxed for 2.5 hours with a mixture of 270 parts by volume of dimethyl formamide and 30 parts by volume of water. The dyestuff was suction-filtered again, washed with ethanol, dried and ground.

When being incorporated into polyvinyl chloride, into a lacquer, a printing ink or a spinning mass, the pigment dye-stuff thus obtained of the formula

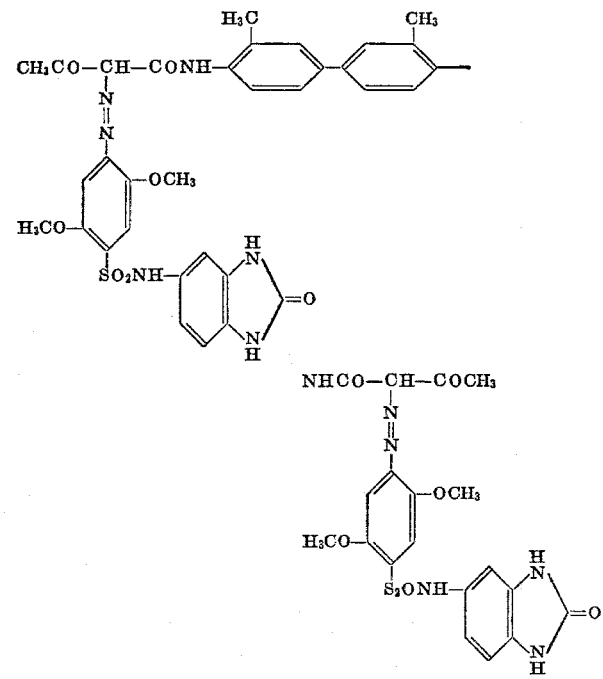

provided pure yellow colorations having a good fastness to heat and a good fastness to light and to migration.

The following Table contains a number of further components to be used according to the invention as well as the shades of the graphic prints of the dyestuffs prepared thereof.

| Diazo component | Coupling component | Shade |
|---|---|---|
| 5-(2',5'-dimethoxy-4'-amino-benzenesulfonylamino)-benzimidazolone. | N-acetoacetylaniline | Yellow. |
| Do | 1-acetoacetylaminonaphthalene. | Do. |
| Do | N-acetoacetyl-2-chloro-aniline. | Do. |
| Do | N-acetoacetyl-4-chloro-aniline. | Do. |
| Do | N-acetoacetyl-2,4-dichloro-aniline. | Do. |
| Do | 2-acetoacetylaminoanisole | Do. |
| Do | 4-acetoacetylaminoanisole | Do. |
| Do | 2-acetoacetylaminotoluene | Do. |
| Do | 4-acetoacetylaminotoluene | Do. |
| Do | 4-acetoacetylamino-1,3-xylene. | Do. |
| Do | 2-acetoacetylamino-5-chloro-toluene. | Do. |
| Do | 2-acetoacetylamino-5-acetylamino-4-chloro-toluene. | Do. |
| Do | 5-acetoacetylamino-6-chloro-benzimidazolone. | Reddish yellow. |
| Do | 5-acetoacetylamino-7-chloro-benzimidazolone. | Do. |
| Do | 1,4-bis-acetoacetylamino-benzene. | Yellow. |
| Do | 1,4-bis-acetoacetylamino-2-chloro-benzene. | Do. |
| 5-(2',5'-dimethoxy-4'-amino-benzenesulfonylamino)-benzimidazolone. | N-acetoacetylaniline | Yellow |
| Do | 1,4-bis-acetoacetylamino-2,5-dichlorobenzene. | Do. |
| Do | 2,5-bis-acetoacetylamino-toluene. | Do. |
| Do | 2,5-bis-acetoacetylamino-1,4-xylene. | Reddish yellow. |
| Do | 2,5-bis-acetoacetylamino-anisole. | Do. |
| Do | 2,5-bis-acetoacetylamino-4-methoxy-toluene. | Do. |
| Do | N,N'-bis-acetoacetyl-benzidine. | Do. |
| Do | N,N'-bis-acetoacetyl-3,3'-dichloro-benzidine. | Yellow. |
| Do | N,N'-bis-acetoacetyl-2,2'-dichloro-benzidine. | Do. |
| Do | N,N'-bis-acetoacetyl-3,3'-dimethoxy-benzidine. | Do. |
| 5-(5'-methoxy-2'-methyl-4'-amino-benzenesulfonylamino)-benzimidazolone. | N-acetoacetyl-4-chloro-2,5-dimethoxy-aniline. | Do. |
| Do | 5-acetoacetylamino-benzimidazolone. | Do. |
| 6-chloro-5-(2',5'-dimethoxy-4'-amino-benzene sulfonylamino)-benzimidazolone. | do | Reddish yellow. |
| 7-chloro-5-(2',5'-dimethoxy-4'-amino-benzene sulfonylamino)-benzimidazolone. | do | Do. |
| Do | N-acetoacetyl-aniline | Yellow. |
| Do | N-acetoacetyl-4-chloro-2,5-dimethoxy-aniline. | Do. |
| 6-bromo-5-(2',5'-dimethoxy-4'-amino-benzene sulfonylamino)-benzimidazolone. | 1,4-bis-acetoacetylamino-2,5-dimethoxy-benzene. | Reddish yellow. |
| 7-bromo-5-(2',5'-dimethoxy-4'-amino-benzene sulfonylamino)-benzimidazolone. | do | Do. |
| 6-methyl-5-(2',5'-dimethoxy-4'-amino-benzene sulfonylamino)-benzimidazolone. | do | Do. |
| Do | N-acetoacetyl-4-chloro-2,5-dimethoxy-aniline. | Yellow. |
| Do | 5-acetoacetylaminobenzimidazolone. | Do. |
| 7-methyl-5-(2',5'-dimethoxy-4'-amino-benzene sulfonylamino)-benzimidazolone. | do | Do. |
| Do | 5-acetoacetylamino-7-chloro-benzimidazolone. | Do. |
| 7-ethyl-5-(2',5'-dimethoxy-4'-amino-benzene sulfonylamino)-benzimidazolone. | do | Do. |
| 7-methoxy-5-(2',5'-dimethoxy-4'-amino-benzene sulfonylamino)-benzimidazolone. | 5-acetoacetylaminobenzimidazolone. | Do. |
| Do | N-acetoacetyl-4-chloro-2,5-dimethoxy-aniline. | Do. |
| 7-ethoxy-5-(2',5'-dimethoxy-4'-amino-benzenesulfonylamino)-benzimidazolone. | do | Do. |
| 7-chloro-5-(5'-methoxy-2'-methyl-4'-amino-benzenesulfonylamino)-benzimidazolone. | do | Do. |
| Do | 5-acetoacetylaminobenzimidazolone. | Reddish yellow. |
| 5-(4'-amino-benzenesulfonylamino)-benzimidazolone. | N-acetoacetylaniline | Yellow. |
| 5-(2'-methyl-5'-ethoxy-4'-amino-benzenesulfonylamino)-benzimidazolone. | 1,4-bis-acetoacetylamino-2,5-dichlorobenzene. | Do. |
| 5-(2',5'-diethoxy-4'-amino-benzenesulfonylamino)-benzimidazolone. | do | Do. |
| 5-(2',5'-dichloro-4'-amino-benzenesulfonylamino)-benzimidazolone. | 5-acetoacetylaminobenzimidazolone. | Do. |
| 5-(2'-chloro-5'-methyl-4'-amino-benzenesulfonylamino)-benzimidazolone. | do | Do. |
| 5-(2'-chloro-5'-methoxy-4'-amino-benzenesulfonylamino)-benzimidazolone. | do | Do. |
| 5-(3'-aminobenzenesulfonylamino)-benzimidazolone. | 5-acetoacetylamino-7-chloro-benzimidazolone. | Do. |
| 5-(3'-amino-4-methyl-benzenesulfonylamino)-benzimidazolone. | 5-acetoacetylamino-7-chloro-benzimidazolone. | Do. |
| 5-(3'-amino-4-methoxybenzene-sulfonylamino)-benzimidazolone. | N-acetoacetylaniline | Do. |
| 5-(3'-amino-4',6'-dimethyl-benzene-sulfonylamino)-benzimidazolone. | 5-acetoacetylaminobenzimidazolone | Do. |
| 5-(3'-amino-4'-chloro-6'-methyl-benzenesulfonylamino)-benzimidazolone. | 1,4-bis-acetoacetylamino-2,5-dimethoxybenzene. | Reddish yellow. |
| 5-(3'-amino-6'-methyl benzenesulfonylamino)-benzimidazolone. | N-acetoacetylaniline | Yellow. |

We claim:
1. A dyestuff of the formula

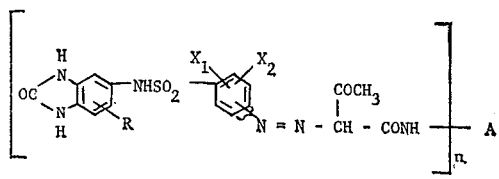

wherein $X_1$ and $X_2$ each is hydrogen, chlorine, bromine, alkyl of 1 to 4 carbon atoms or alkoxy of 1 to 4 carbon atoms, R is hydrogen, chlorine, bromine, methyl, ethyl, methoxy or ethoxy, $n$ is 1 or 2, and A is phenyl, naphthyl or benzimidazolyl if $n$ is 1 or phenyl or diphenyl if $n$ is 2.

2. The dyestuff of the formula

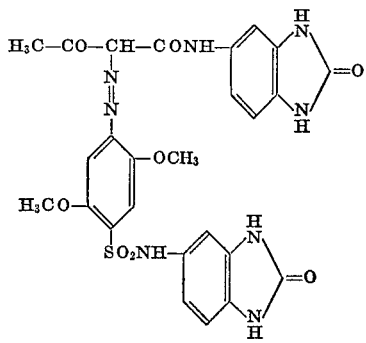

3. The dyestuff of the formula

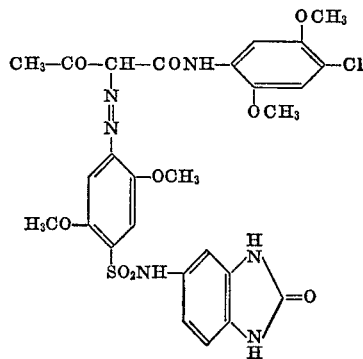

4. The dyestuff of the formula

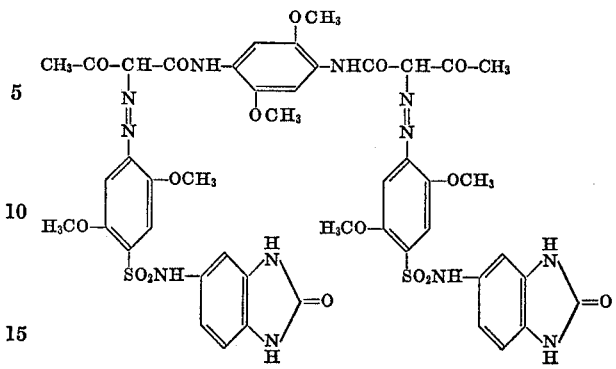

References Cited

UNITED STATES PATENTS

| | | | |
|---|---|---|---|
| 3,328,384 | 6/1967 | Dietz et al. | 260—157 |
| 2,840,552 | 6/1958 | Sureau et al. | 260—157 |
| Re. 25,857 | 9/1965 | Schilling et al. | 260—157 |
| Re. 27,575 | 2/1973 | Ribka et al. | 260—157 |

FLOYD D. HIGEL, Primary Examiner

R. W. RAMSUER, Assistant Examiner

U.S. Cl. X.R.

260—309.2, 239.9; 106—23, 288 Q, 308 Q; 117—123 C, 138, 8 R, 138.8 F, 138.8 E, 138.8 PV, 138.8 UA, 139, 143, R, 154